March 15, 1955 N. H. PREBLE ET AL 2,703,954
DRAWBAR ASSEMBLY
Original Filed June 27, 1949 2 Sheets-Sheet 1
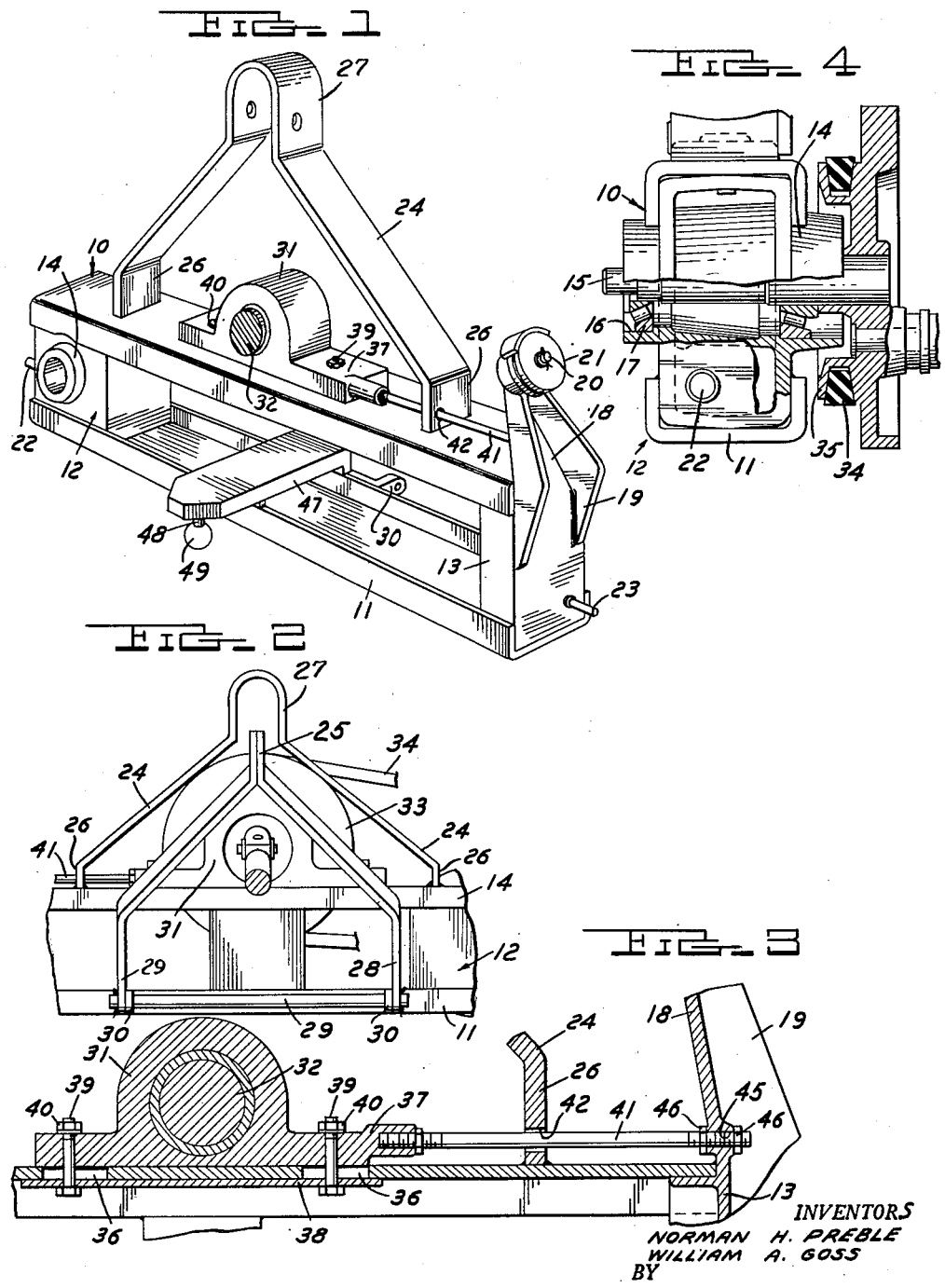
INVENTORS
NORMAN H. PREBLE
WILLIAM A. GOSS
BY
ATTORNEYS

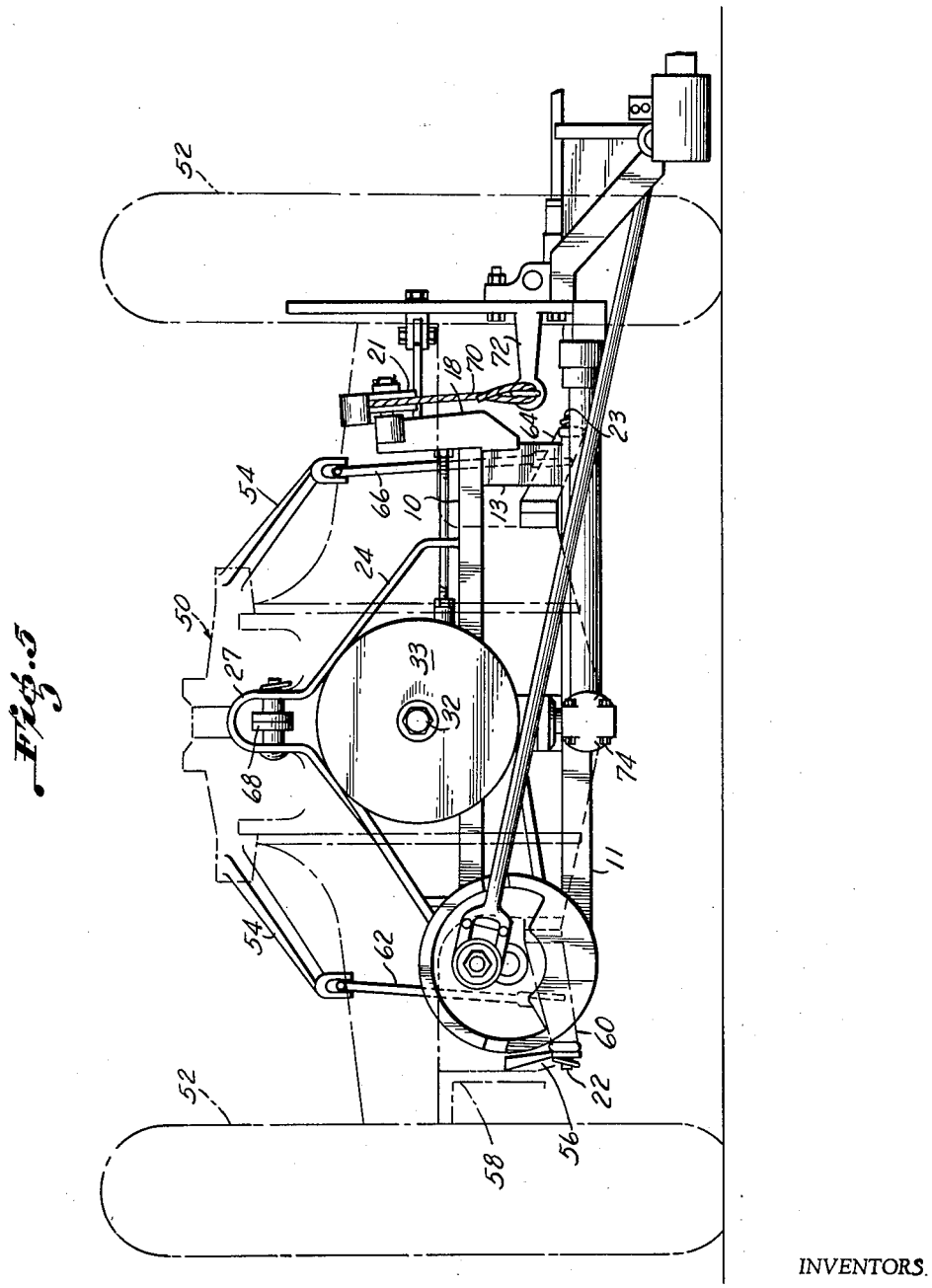

United States Patent Office 2,703,954
Patented Mar. 15, 1955

2,703,954

DRAWBAR ASSEMBLY

Norman H. Preble, Detroit, Mich., and William A. Goss, Zanesville, Ohio, assignors to Detroit Harvester Company, Detroit, Mich., a corporation of Michigan Original application June 27, 1949, Serial No. 101,518, now Patent No. 2,669,825, dated February 23, 1954. Divided and this application June 12, 1950, Serial No. 167,522

5 Claims.  (Cl. 56—25)

This invention relates to improvements in drawbars of the type employed for connecting attachments such, for example, as mowers to tractors, and is a division of our copending application Serial No. 101,518, filed June 27, 1949, now Patent No. 2,669,825 issued February 23, 1954.

It is an object of this invention to provide a drawbar comprising a relatively few simple parts permanently secured together and cooperating with one another to provide an exceptionally rigid structure.

It is another object of this invention to provide a drawbar of the above general type wherein certain of the parts thereof are designed to support implement driving mechanism and various attachments including elements for connecting the drawbar to both the tractor and implement.

The foregoing as well as other objects will be made more apparent as this description proceeds, especially when considered in connection with the accompanying drawing, wherein:

Figure 1 is an enlarged perspective view of a drawbar constructed in accordance with this invention;

Figure 2 is a fragmentary front elevational view of the drawbar shown in Figure 1;

Figure 3 is an enlarged sectional view through a part of the drawbar;

Figure 4 is a cross sectional view through a part of the drawbar and showing part of the driving mechanism supported on the drawbar.

Figure 5 is a rear elevation showing the connections between the drawbar and a tractor.

Although the drawbar forming the subject matter of this invention may be advantageously used for connecting various different types of implements to draft vehicles, nevertheless, it is particularly applicable for connecting mower attachments to orthodox tractors of the type having a power takeoff shaft and power operated lift arms. A typical mower attachment and tractor in connection with which the drawbar featured herein may be used is shown and described in our copending application Serial No. 101,518 now Patent No. 2,669,825. Since the present invention concerns itself more particularly with the construction of the drawbar regardless of its use, the mower attachment and tractor are not specifically illustrated or described herein.

As will be presently set forth, the drawbar forming the subject matter of this invention comprises a plurality of separately formed parts permanently secured together to provide a rigid structure capable of readily attaching an implement, such as a mower, to a tractor; and also forming a stable support for various attachments including part of the implement driving mechanism. In detail the drawbar has elongated structural members 10 and 11 supported in vertical spaced relationship by spacers 12 and 13 respectively positioned between the members at opposite ends of the latter. As shown in Figure 4 of the drawing, the structural members are substantially channel-shaped in cross section throughout their length, and the spacers are respectively seated within the channels of both members. In the present instance the spacers are welded or otherwise permanently secured to the members in order to provide an exceptionally strong, rigid construction.

The spacer 12 is preferably, although not necessarily, in the form of a casting, and in any case, is fashioned to provide a bearing 14 for a suitable operating shaft 15. The bore 16 in the bearing through which the shaft 15 extends has its axis extending horizontally and perpendicular to the length of the drawbar, and antifriction bearings 17 for the shaft 15 are seated in the bore 16 adjacent opposite ends of the latter.

The spacer 13 may also be in the form of a casting, and is shown in Figures 1 and 3 of the drawings as formed with a bracket 18 which extends upwardly beyond the top structural member 10. The upstanding portion of the bracket 18 is effectively reinforced by ribs 19 and provides a support for a shaft 20. Journalled on the shaft 20 is a pulley 21, which acts as a guide for a suitable cable, as shown in Fig. 5.

Suitably supported on the spacers 12 and 13 are pivot pins 22 and 23, respectively. These pins project outwardly from opposite ends of the drawbar, and provide mountings for the usual tractor lifting arms, as shown in Fig. 5.

Additional means is provided on the drawbar for connecting the latter to the tractor. This means comprises a pair of yokes 24 and 25. The yoke 24 is in the form of an inverted substantially V-shaped strap having the free end portions 26 welded or otherwise permanently secured to the top structural member 10. The yoke 24 extends vertically in an upward direction from the drawbar, and the upper end thereof is fashioned to form a loop 27. In use a link 68 extends between the sides of the loop, and is pivoted to the latter. This link is adapted for connection to suitable elevating means on the tractor or draft vehicle.

The second yoke 25 is also in the form of a substantially V-shaped strap which extends upwardly in an inverted position from the bottom structural member 11. As shown in Figure 2 of the drawing, the free end portions 28 of the yoke 25 are pivoted by a pin 29 to brackets 30 and the latter are welded or otherwise fixed to the front flange of the bottom structural member 11. The upper end of the yoke 25 is fashioned to provide a pivotal support for a pin (not shown), and in use, is pivoted to the link connection between the yoke 24 and the tractor. The two yokes 24 and 25 cooperate during use to stabilize the drawbar.

Referring now to Figure 3 of the drawing, it will be noted that a bearing 31 is supported on the top structural member 10 with the axis of the bore extending normal to the drawbar or parallel to the bore 16 in the bearing 17. The bearing 31 supports a shaft 32, and in use this shaft is connected to the power takeoff shaft of the tractor. In the present instance the shaft 32 is connected to the shaft 15 for driving the latter. In detail a pulley 33 is secured to the shaft 32 and is connected by a belt 34 to a pulley 35 mounted on the shaft 15.

The bearing 31 is supported on the top structural member 10 for sliding movement lengthwise of the latter in order to vary the tension of the belt 34. Referring again to Figure 3 of the drawing, it will be noted that the structural member 10 is formed with longitudinally spaced slots 36, which are elongated in the direction of length of the member 10, and respectively register with openings extending through attaching flanges 37 on opposite sides of the bearing 31. Supported beneath the member 10 opposite the bearing 31 is a plate 38, and the purpose of this plate is to frictionally clamp the bearing in any selected adjusted position relative to the structural member 10. The clamping action is effected by bolts 39 and nuts 40. The bolts 39 project upwardly through suitable openings in the plate 38, and also through the slots 36 and openings in the attaching flanges 37 of the bearing. The clamping nuts 40 are threadably engaged with the upper ends of the bolts 39, and cooperate with the plate 38 to frictionally clamp the bearing in place on the structural member 10.

It will be noted from Figure 1 of the drawing that the bearing 31 is located within the confines of the yoke 24, and in order to facilitate adjustment of the bearing, provision is made at one end of the drawbar for moving the bearing longitudinally of the drawbar. In detail a rod 41 is secured at the inner end to the adjacent side of the bearing 31, and extends outwardly through a clearance opening 42 is formed in the adjacent part of the yoke 24. The outer end of the rod 41 extends through an opening 45 formed in the spacer 13 or in the bracket 18 on this spacer. The outer end of the rod is threaded and suitable nuts 46 are respectively threadably supported on the outer end of the rod at opposite sides of the spacer 13 or bracket 18. The arrangement is such that by manipulating the nuts 46, the bearing 41 may be readily moved lengthwise of the drawbar to vary the spacing between the shafts 32 and 15, or in other words, to vary the tension of the belt 34.

Provision is also made on the drawbar for connecting the latter to the implement or drag bar of a mower attachment. This is accomplished by a bracket 47 supported on the drawbar intermediate the ends of the latter and extending between the structural members 10 and 11. As shown in Figure 1 of the drawing, the bracket is welded or otherwise permanently secured to the bottom structural member 11, and projects laterally beyond the rear side of the drawbar. A fitting 48 is welded or otherwise permanently secured to the projecting end of the bracket at the rear side of the drawbar, and is fashioned with a ball or spherical portion 49. In use the ball is engaged in a socket provided at the inner end of a drag bar (not shown) to form a universal connection between the drawbar and drag bar.

In Figure 5 the drawbar is shown as attached to a tractor having a frame 50, wheels 52, and lift arms 54.

Secured to the pin 22 at the left hand end of the drawbar is a link 56 pivoted at its forward end to a frame member 58 of the tractor to support the left hand end of the drawbar for generally vertical rocking movement. Also secured to the pin 22 is a forwardly extending link 60 the forward end of which is also secured to a frame part of the tractor for vertical swinging movement. The link 60 is connected by a rod 62 to the left hand lift arm 54.

A similar arrangement is provided at the opposite end of the drawbar wherein the pin 23 connects the end of the drawbar to a link 64, the forward end of which is pivotally connected to the frame of the tractor. Intermediate the ends of the link 64 is the rod 66, the upper end of which is carried by the right hand lift arm 54.

Another link 68 is provided which connects the loop 27 of the drawbar to the tractor.

The pulley 21 carried by the integral bracket 18 has a cable 70 reeved thereover, one end of the cable being connected to a lever 72, the other end of the cable being connected to a spring (not shown) for the purpose of counterbalancing the weight of the cutter bar assembly, which is the implement illustrated as attached to the drawbar. The cutter bar assembly in this figure is illustrated as attached to the drawbar by a universal joint assembly 74 in which the ball 49 is enclosed.

The drawbar described provides a simple, compact structure having provision for connecting an implement such as a mower attachment to a tractor and constructed to effectively withstand severe bending and torsional stresses. In addition provision is made on the drawbar for supporting the driving mechanism employed to connect the tractor power takeoff shaft to the implement attached to the tractor by the drawbar.

What we claim as our invention is:

1. A drawbar for connection between a tractor having a pair of laterally spaced lift arms adjacent the rear thereof, and an implement such as a mower; said drawbar comprising a pair of vertically spaced elongated channel shaped structural members adapted to extend transversely of the tractor at the rear thereof, a pair of spacers in the form of relatively heavy castings between said members at the ends thereof and rigidly secured thereto, pivot means carried by each of said spacers for connection to links secured to the lift arms of the tractor, one of said spacers having an integral bracket extending upwardly therefrom, and a pulley pivoted to the upper end of said arm for guiding a cable connected between a part of the tractor and a part of the implement.

2. A drawbar for connection between a tractor having a pair of laterally spaced lift arms adjacent the rear thereof, and an implement such as a mower; said drawbar comprising a pair of vertically spaced elongated structural members adapted to extend transversely of the tractor at the rear thereof, a pair of spacers between said members at the ends thereof and rigidly secured thereto, pivot means carried by each of said spacers for connection to links secured to the lift arms of the tractor, a yoke having its ends permanently and rigidly secured to the top of the upper member and extending upwardly therefrom, a loop at the top of said yoke for the reception of the end of a third link extending rearwardly from the tractor, and a second yoke having its ends pivotally secured to the lower member at the side thereof adjacent the tractor and having means intermediate its ends for connection to the third link.

3. A drawbar as defined in claim 2 comprising a bracket extending rearwardly from said drawbar and including means thereon for connection to an implement.

4. A drawbar for connection between a tractor having a pair of laterally spaced lift arms adjacent the rear thereof and a power take-off shaft, and an implement such as a mower including means for actuation by the power take-off shaft; said drawbar comprising a pair of vertically spaced elongated structural members adapted to extend transversely of the tractor at the rear thereof, a pair of spacers between said members at the ends thereof and rigidly secured thereto, pivot means carried by each of said spacers for connection to links secured to the lift arms of the tractor, one of said spacers having a bearing therein for the reception of a rotary shaft, a second bearing carried by one of said members for receiving a second rotary shaft, a yoke having its ends permanently and rigidly secured to the top of the upper member and extending upwardly therefrom, a loop at the end of said yoke for the reception of the end of a third link extending rearwardly from the tractor, a second yoke having its ends pivotally secured to the lower member at the side adjacent the tractor and having means intermediate its ends for connection to the third link.

5. A drawbar as defined in claim 4 comprising a bracket extending rearwardly from said drawbar and including means thereon for connection to an implement.

References Cited in the file of this patent

UNITED STATES PATENTS

| | | |
|---|---|---|
| 1,551,377 | Dunlap | Aug. 25, 1925 |
| 1,947,552 | Huddle | Feb. 20, 1934 |
| 2,184,541 | Aikman | Dec. 26, 1939 |
| 2,341,807 | Olmstead et al. | Feb. 15, 1944 |
| 2,465,641 | Gardner | Mar. 29, 1949 |
| 2,503,605 | Abgarian | Apr. 11, 1950 |
| 2,517,384 | Brown | Aug. 1, 1950 |
| 2,531,768 | Cline | Nov. 28, 1950 |

FOREIGN PATENTS

| | | |
|---|---|---|
| 575,650 | Great Britain | Feb. 27, 1946 |